(12) United States Patent
Ginter et al.

(10) Patent No.: US 10,069,359 B2
(45) Date of Patent: Sep. 4, 2018

(54) ELECTRIC MOTOR

(71) Applicant: EBM-PAPST ST. GEORGEN GMBH & CO. KG, St. Georgen (DE)

(72) Inventors: Andreas Ginter, Schramberg-Heiligenbronn (DE); Markus Flaig, Hardt (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 226 days.

(21) Appl. No.: 15/026,587

(22) PCT Filed: Oct. 1, 2014

(86) PCT No.: PCT/EP2014/071019
§ 371 (c)(1),
(2) Date: Mar. 31, 2016

(87) PCT Pub. No.: WO2015/049274
PCT Pub. Date: Apr. 9, 2015

(65) Prior Publication Data
US 2016/0248285 A1   Aug. 25, 2016

(30) Foreign Application Priority Data

Oct. 2, 2013   (DE) .................. 10 2013 110 999

(51) Int. Cl.
*H02K 1/27* (2006.01)
*H02K 5/16* (2006.01)
(Continued)

(52) U.S. Cl.
CPC ........... *H02K 1/2786* (2013.01); *H02K 5/161* (2013.01); *H02K 5/173* (2013.01); *H02K 7/14* (2013.01);
(Continued)

(58) Field of Classification Search
CPC ........ H02K 1/27; H02K 1/2786; H02K 5/161; H02K 7/14; H02K 5/173; H02K 21/22; H02K 2213/03; H02K 16/02
(Continued)

(56) References Cited

U.S. PATENT DOCUMENTS 4,417,167 A   11/1983   Ishii et al. ................ 310/67 R
7,385,323 B2   6/2008   Takahashi et al.
(Continued)

FOREIGN PATENT DOCUMENTS

DE   28 40 057        3/1979
DE   102006059135 A   6/2008
(Continued)

OTHER PUBLICATIONS

Delo Industrial Adhesives, "DELO-ML DB180 Technical Information," Mar. 2016 (Revision 38), 9 pp., Windach, Germany D-86049.
(Continued)

*Primary Examiner* — Naishadh Desai
(74) *Attorney, Agent, or Firm* — Milton Oliver, Esq.; Oliver Intellectual Property

(57) ABSTRACT

An electric motor has an internal stator (21) and an external rotor (2). The external rotor (2) has a rotor housing (3) and a plurality of magnets (9) mounted therein and is adapted to rotate around a rotation axis (10); the magnets (9) are preferably bar magnets; the rotor housing (3) has an inner surface (7), a first end (5), and a second end (6) located opposite the first end (5) and the inner surface defines respective receiving surfaces (11) for reception of the magnets. each receiving surface features a channel depression (13) to receive a magnet (9). The magnets (9) are each fastened on a respective one of the receiving surfaces (11) with the aid of an adhesive mounting agent (36). A first (Continued)

bearing seat (14) for reception of a first bearing cage (15) is formed at the second end (6) of the rotor housing (3).

18 Claims, 12 Drawing Sheets

(51) Int. Cl.
  *H02K 7/14* (2006.01)
  *H02K 5/173* (2006.01)
  *H02K 21/22* (2006.01)
(52) U.S. Cl.
  CPC ......... *H02K 21/22* (2013.01); *H02K 2213/03* (2013.01)
(58) Field of Classification Search
  USPC ........................................ 310/156.56, 156.53
  See application file for complete search history.

(56) References Cited

U.S. PATENT DOCUMENTS

| | | | |
|---|---|---|---|
| 8,847,453 B2 | 9/2014 | Bayer et al. | |
| 2004/0140725 A1* | 7/2004 | Takahashi | H02K 1/278 310/156.21 |
| 2005/0225192 A1* | 10/2005 | Kloepzig | H02K 1/2753 310/156.43 |
| 2007/0024141 A1* | 2/2007 | Drexlmaier | H02K 1/278 310/156.19 |
| 2007/0236099 A1* | 10/2007 | Kim | D06F 37/304 310/266 |
| 2011/0254474 A1* | 10/2011 | Saito | H02K 1/24 318/139 |
| 2012/0098271 A1 | 4/2012 | Bayer et al. | |
| 2014/0117799 A1* | 5/2014 | Lu | H02K 21/22 310/71 |
| 2014/0159532 A1* | 6/2014 | Kondou | H02K 1/276 310/156.53 |
| 2014/0319938 A1* | 10/2014 | Weller | H02K 1/27 310/50 |
| 2016/0197527 A1* | 7/2016 | Yamada | H02K 1/2706 310/156.21 |

FOREIGN PATENT DOCUMENTS

DE  102009031371 A1  1/2011
JP  2005065388 A  10/2005

OTHER PUBLICATIONS

Henkel Corp., "LOCTITE AA3504 Technical Data Sheet," Oct. 2014, 5 pp., retrieved Mar. 2016 from website www.Henkel-NorthAmerica.com, Rocky Hill CT 06067 & other US locations.

* cited by examiner

ELECTRIC MOTOR

CROSS-REFERENCES

This application is a section 371 of PCT/EP2014/071019, filed Oct. 1, 2014, published as WO 2015-049274 and further claims priority from DE 10 2013 110 999.3 filed Oct. 2, 2013.

FIELD OF THE INVENTION

The invention relates to an electric motor having an internal stator and an external rotor.

BACKGROUND

Electric motors that comprise an internal stator and an external rotor are usually equipped with magnets in the form of annular permanent magnets. The external rotor comprises a rotor housing implemented in the manner of a hollow cylinder or a cup. The internal stator is received in the interior of the rotor housing, thus in a manner predominantly surrounded by the rotor housing, so that the external rotor is rotatable around the internal stator. An annularly shaped permanent magnet has an outer contour whose shape is adapted to the inner surface of the rotor housing and can thus easily be fastened thereon.

SUMMARY OF THE INVENTION

The object of the present invention is to furnish an electric motor that exhibits improved performance simultaneously with simple manufacturability.

The object is achieved by an electric motor having a generally cylindrical rotor housing whose inner surface is formed with respective receiving surfaces, each for receiving a magnet affixed with an adhesive mounting agent, the rotor housing being formed at one end with a first bearing cage for mounting a first rotary bearing therein.

Advantageous embodiments having useful and non-trivial refinements of the invention are described in the following specification below.

The electric motor preferably comprises an internal stator and an external rotor. The external rotor has a rotor housing and a plurality of magnets, and is implemented to rotate around a rotation axis. The magnets are implemented in the form of bar magnets. The rotor housing has an inner surface, a first end, and a second end located opposite the first end. The inner surface comprises receiving surfaces for reception of the magnets, which receiving surfaces respectively serve for arrangement of one of the magnets and comprise a channel-like depression, and which magnets are respectively fastened on one of the receiving surfaces with the aid of an adhesive mounting agent, a first bearing seat for reception of a first bearing cage being implemented at the second end (6) of the rotor housing.

Permanent magnets in the shape of bar-shaped permanent magnets, which are referred to hereinafter as "bar magnets," are thus preferably used. The advantage is a greater magnetic flux achievable with the aid of the bar magnets as compared with usual annular permanent magnets, so that improved performance for the electric motor can be achieved. Corresponding magnets made of a permanently magnetic material exhibit permanently magnetic properties.

Annular permanent magnets having radial magnetization are manufactured predominantly in the form of plastic-bonded isotropic magnets, in which isotropic permanently magnetic particles are embedded in a plastic matrix.

Magnetically anisotropic permanently magnetic particles have a preferred direction in which they can generate a strong magnetic field and thus a strong magnetic flux, which is usually stronger than with magnetically isotropic permanently magnetic materials. In the direction deviating from the preferred direction, conversely, the magnetic field that can be generated is appreciably less. An alignment of the anisotropic magnets at the time of manufacture is therefore advantageous for achieving a strong permanent magnet. Such an alignment is possible only with great difficulty in the context of annular magnets having radial magnetization.

With bar-shaped magnets, on the other hand, the magnetic material can be manufactured in a plate shape in a magnetic field, with the result that an alignment of the anisotropic material in the preferred direction can be achieved in the context of manufacture. The bar-shaped magnets can then, for example, be sawn out. In addition to manufacture as a plastic-bonded bar-shaped magnet, manufacturing by sintering is also possible, with the result that more magnetic material per unit volume is present since little or no plastic is present. This results in very strong magnets made of a sintered material.

Tolerances in the fitting of an annular permanent magnet in a rotor housing are furthermore more critical than with a bar-shaped permanent magnet, since while a tolerance of the bar-shaped permanent magnet results in a tolerance of the air gap, i.e. of the non-magnetic region between the internal rotor and the permanent magnet, a deviation in the outer circumference of an annular permanent magnet can cause the permanent magnet either not to fit into the rotor housing if it is too large, or not to be correctly mounted if it is too small. An air gap between the rotor magnet and the internal stator which is decreased as a result of tolerances furthermore causes a decrease in power output, and inaccurate seating of the rotor magnet causes an undesired imbalance.

The construction of a corresponding rotor housing is more complex than in the case of a rotor housing for annular magnets, but it is possible to use advantageous bar magnets that can be stronger and more inexpensive than annular magnets. Because the rotor housing is already of more complex implementation, the first bearing seat for reception of the first bearing cage can advantageously be implemented at the second end of the rotor housing, i.e. in the region of the second end of the rotor housing, so that the rotor housing can take on additional functions. The bearing seat enables the reception of, for example, a rolling bearing, in particular a ball bearing, preferably concurrently with possible inexpensive manufacture using the deep drawing process.

Advantageously, the magnets are fastened on the inner surface, or more precisely on the receiving surfaces, with the aid of an adhesive mounting agent. Adhesive mounting agents enable simple mounting of the bar magnets onto the receiving surfaces, that are preferably predominantly of planar configuration. Preferably the bar magnets can in particular, so to speak, be positioned in their corresponding final position from inside to outside onto the receiving surfaces. This means that, in order to be fastened in their final position the bar magnets can be moved, proceeding from a first installation position that is located in an inner region surrounded by the rotor housing, substantially in a radial direction so as thereby to rest in planar fashion on their corresponding receiving surfaces. The advantage of this installation is that the mounting agent that has been applied onto the receiving surface is not shifted, but predominantly remains on the receiving surface. For example, if the bar magnet, proceeding from a first end of the rotor housing, were pushed onto its designated receiving surface in a longitudinal direction of the rotor housing until its final position is reached, a certain quantity of the mounting agent would likewise be shifted, so that poor fastening of the bar magnet might result.

The rotor housing is preferably implemented, at least locally, in the manner of a hollow cylinder, for example having an at least locally polygonal cross section. In other words, the cross-sectional contour of the rotor housing can be referred to at least locally as "annular."

In a preferred embodiment of the electric motor the inner surface of the rotor housing comprises, for reception of the bar magnets, a number of receiving surfaces corresponding to the number of bar magnets, which surfaces are implemented to be predominantly planar, i.e. flat, both in a direction parallel to the rotation axis of the rotor housing and in a circumferential direction of the inner surface. With the aid of these receiving surfaces, implemented in predominantly planar fashion, it is possible to use simple bar magnets that are, for example, implemented cuboidally or are of square or rectangular shape in cross section. These bar magnets are inexpensive to manufacture, since complex machining of an outer contour of the bar-shaped permanent magnets, facing toward the inner surface, is not necessary. These bar-shaped permanent magnets can thus be manufactured in simple fashion.

Preferably the dimension of the respective receiving surfaces in a first direction that is parallel to the rotation axis is larger than the dimension of the associated magnet in the first direction, and the dimension of the respective receiving surfaces in a second direction that is perpendicular to the first direction is larger than the dimension of the associated magnet in the second direction. This enables good installation of the magnets on the receiving surfaces; and when an adhesive is used to fasten the magnets, it can be displaced on all sides.

Preferably the receiving surfaces and the associated magnets respectively comprise a common connecting region in which they are arranged adjacently, the receiving surfaces respectively extending beyond the connecting region on all sides thereof. This allows all the bar-shaped magnets to be arranged and pressed on by means of a holding and pressing apparatus, and enables subsequent curing of an adhesive that may be present. A corresponding conformation furthermore enables the rotor housing to be manufactured by deep drawing.

Preferably the cross-sectional contour of the transition of the inner surface between two adjacent receiving surfaces is implemented concavely. This allows an adhesive mounting agent to be distributed over the entire circumference by rotation and axial shifting of an injection nozzle for the mounting agent, and simplifies manufacture of the rotor housing using a deep-drawing process.

Preferably the inner surface of the rotor housing has, for reception of the bar magnets, a polygonally implemented cross-sectional contour. With the aid of the polygonally implemented inner surface, the receiving surfaces implemented in predominantly planar fashion for reception of the bar magnets are present locally. An outer surface of the rotor housing can likewise be configured with a polygonal cross-sectional contour corresponding to the inner surface, but a circular cross-sectional contour of the outer surface is also conceivable. This polygonally implemented cross-sectional contour of the inner surface can be manufactured with the aid of a deep drawing process, since no undercuts are present.

Preferably the inner surface has a 14-sided polygonal cross-sectional contour, so that fourteen bar magnets can be received. This number of bar magnets has proven to be suitable, in particular, in the context of an electric motor having an external rotor for operation of a feed roller. With the aid of this 14-sided polygonal cross-sectional contour it is possible to advantageously position the number of bar magnets necessary for achieving a specific power output, which magnets have an advantageous width, sufficient for achieving this specific power output, in a circumferential direction of the rotor housing. At the same time, optimized transitions that are likewise compatible with the manufacturing process can be created between each two receiving surfaces, so that an available installation space can be optimally utilized with no possible impairment of motor power output.

Preferably an internal stator comprising twelve slots or winding cavities, each for reception of one stator winding, is positioned in the external rotor, i.e. is at least partly surrounded by the external rotor.

In a further preferred embodiment of the electric motor, the receiving surface comprises, in a direction parallel to the rotation axis, a channel-like depression. This depression, implemented in channel-like fashion in the longitudinal direction, ensures a defined region for reception of an adhesive mounting agent (fastening agent) for fastening the bar magnets on the inner surface of the rotor housing, since the adhesive mounting agent is received in the channel-like depression, similarly to a trough. The orientation in a longitudinal direction is positive because, on the one hand, it simplifies manufacture by deep drawing and, on the other hand, more space for the emerging adhesive mounting agent, i.e. for example the adhesive, can be provided on the axial sides of the magnets. Alternatively, the channel-like depressions can also, for example, extend obliquely or in a circumferential direction.

Preferably the channel-like depression possesses, in a direction parallel to the rotation axis, a first length that is greater than a second length, implemented in a direction parallel to the rotation axis, of the bar magnet fastened on the receiving surface. This has the advantage that excess adhesive mounting agent can collect in the depression in the regions that are not covered by the bar magnet, without causing planar fastening of the bar magnet on the magnet seat to be nullified by excess adhesive mounting agent. In the installation process, the inner wall of the rotor housing is equipped with the adhesive mounting agent before the bar magnet is pressed onto the receiving surface that is implemented in predominantly planar fashion and comprises the depression. If the first length of the depression were to correspond to the second length of the bar magnet, excess adhesive mounting agent would have difficulty escaping in a longitudinal direction and would accumulate on a fastening surface, implemented facing toward the depression, of the bar magnet, so that the bar magnet might exhibit incorrect positioning or an incorrect final position at the end of the installation process, since the excess adhesive mounting agent might have difficulty escaping and an elevation and/or obliquity of the bar magnet might occur due to the excess adhesive mounting agent. Due to the incorrect positioning, operation of the electric motor would not be ensured, as a result of possible contact between the internal stator and external rotor in the region of the incorrectly positioned bar magnet. This preferred configuration of the electric motor thus results in better operation and in better installation thereof.

In a further preferred embodiment of the electric motor, the rotor housing has an inside diameter that is implemented to be constant or decreasing proceeding from a first end to a second end located opposite the first end. This offers the advantage that a deep drawing process is particularly well suited for manufacture, and thus enables inexpensive manufacture.

According to a preferred embodiment the rotor housing has, at the second end, a first rotor housing portion having an inside diameter, which inside diameter is smaller than the inside diameter of the rotor housing in a second rotor housing portion in which the magnets are mounted, so as thereby to form the bearing seat at the second end. This implementation of the rotor housing enables an advantageous implementation of the bearing seat as part of the rotor housing.

According to a preferred embodiment the rotor housing tapers in a third rotor housing portion that is arranged between the first rotor housing portion and second rotor housing portion, forming a shoulder. On the one hand, this saves weight, thanks to the taper of the rotor housing and, on the other hand, this configuration enables a preferred configuration of the rotor housing as a deep drawn part having an integrated bearing seat.

According to a preferred embodiment, the bearing seat and the rotor housing are implemented in one piece (integrally). Whereas with a usual rotor housing, it is possible to use a round tube on which a respective flange is axially mounted, the rotor housing for the bar magnets is of more complex construction because of the configuration of the receiving surfaces. With this more complex configuration of the rotor housing, it has proven to be advantageous to integrate the bearing seat into the rotor housing. In the context of manufacture by deep drawing, for example, the bearing seat can thus be implemented concurrently by deep drawing, using additional deep drawing steps that can readily be integrated into the deep drawing operation. Subsequent installation is made easier because the bearing can be inserted directly into the rotor housing with no need for additional installation of an axial flange.

Preferably the distance between two adjacent magnets in a predefined inner-surface distance from the respectively associated inner surface of the rotor housing decreases, at least locally, as the inner-surface distance increases. This enables better gripping of the magnets upon installation, in contrast to an arrangement in which the distance increases or remains the same.

A predefined minimum distance is preferably always provided between two magnets. Holding of the magnets by a holding and pressing apparatus in the context of installation is simplified by the fact that the magnets do not touch one another.

A drive roller preferably has an electric motor according to one of the preceding claims. This enables a high mechanical power output for the drive roller for a given physical size of the drive roller, and a drive roller of this kind is therefore particularly advantageous.

Further advantages, features, and details of the invention are evident from the description below of preferred exemplifying embodiments, and from the drawings. The features and feature combinations recited in the description, as well as the features and feature combinations recited above in the description of the figures and/or merely shown in the figures, are usable not only in the particular combination indicated but also in other combinations or in isolation, without departing from the context of the invention.

For reasons of clarity in the figures, for the most part only those features which serve for description of the corresponding figure are usefully supplied with a reference character. For reasons of clarity, it is possible for the elements not to be supplied with their reference character in all figures, without nevertheless losing their correlation.

BRIEF FIGURE DESCRIPTION

DETAILED DESCRIPTION

Figure 12:
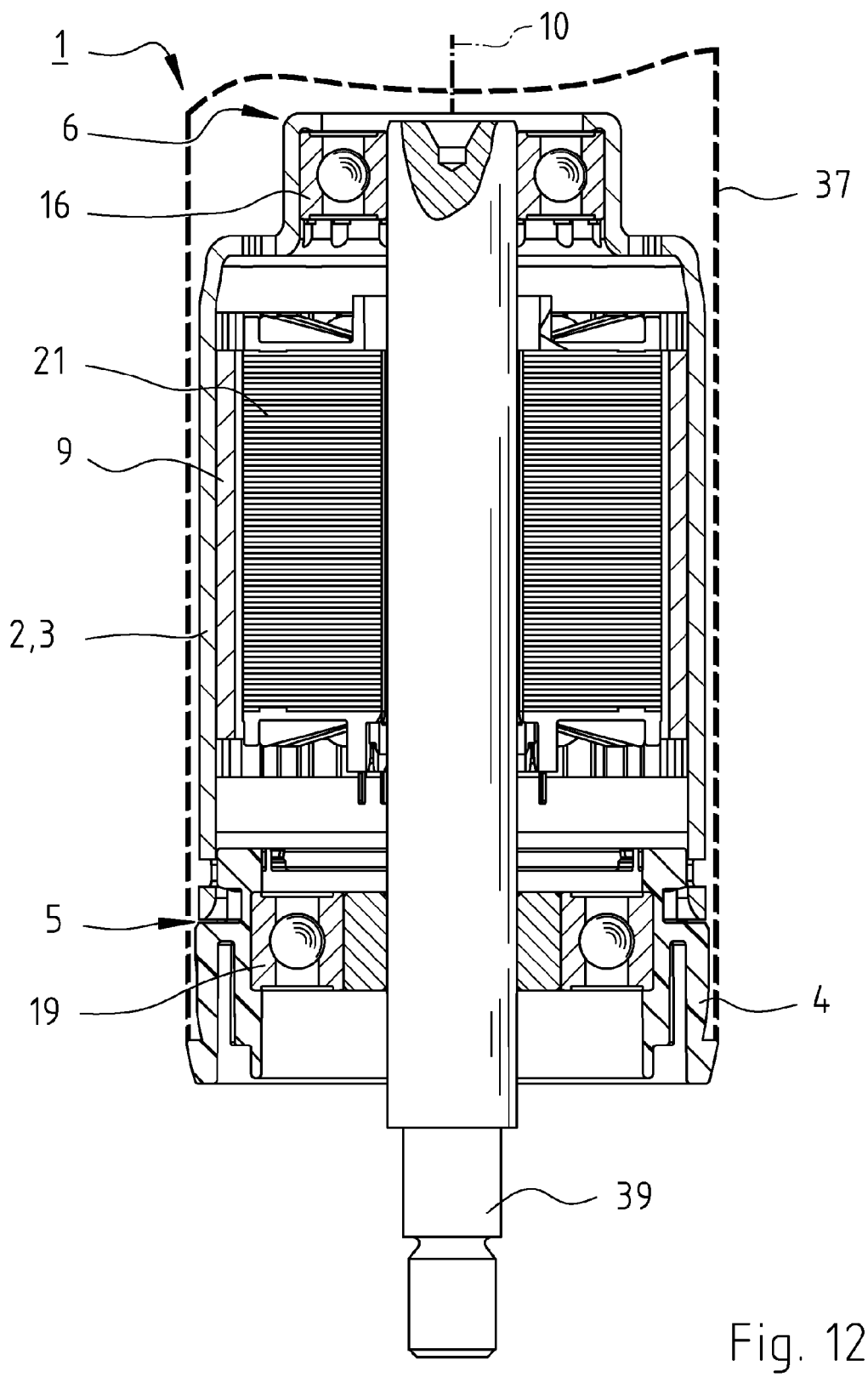
FIG. 12 is a longitudinal section of the electric motor having a drive roller mounted thereon.

FIG. 12 shows an electric motor 1 in the form of an external-rotor motor. Electric motor 1 comprises an internal stator 21 and an external rotor 2, largely surrounding internal stator 21, having a rotor housing 3. A roller flange 4 for secured reception and positioning of a drive roller 37 is implemented at a first end 5 of rotor housing 3. A second end 6 of rotor housing 3 located opposite first end 5 is configured for reception of a first bearing 16 for rotatable journaling of external rotor 2 around a rotation axis 10 of electric motor 1, and a second bearing 19 is preferably arranged in roller flange 4. A stationary shaft 39, which is mounted e.g. on a system (not depicted) having drive rollers, serves as a bearing point for bearings 16, 19.

Figure 1:
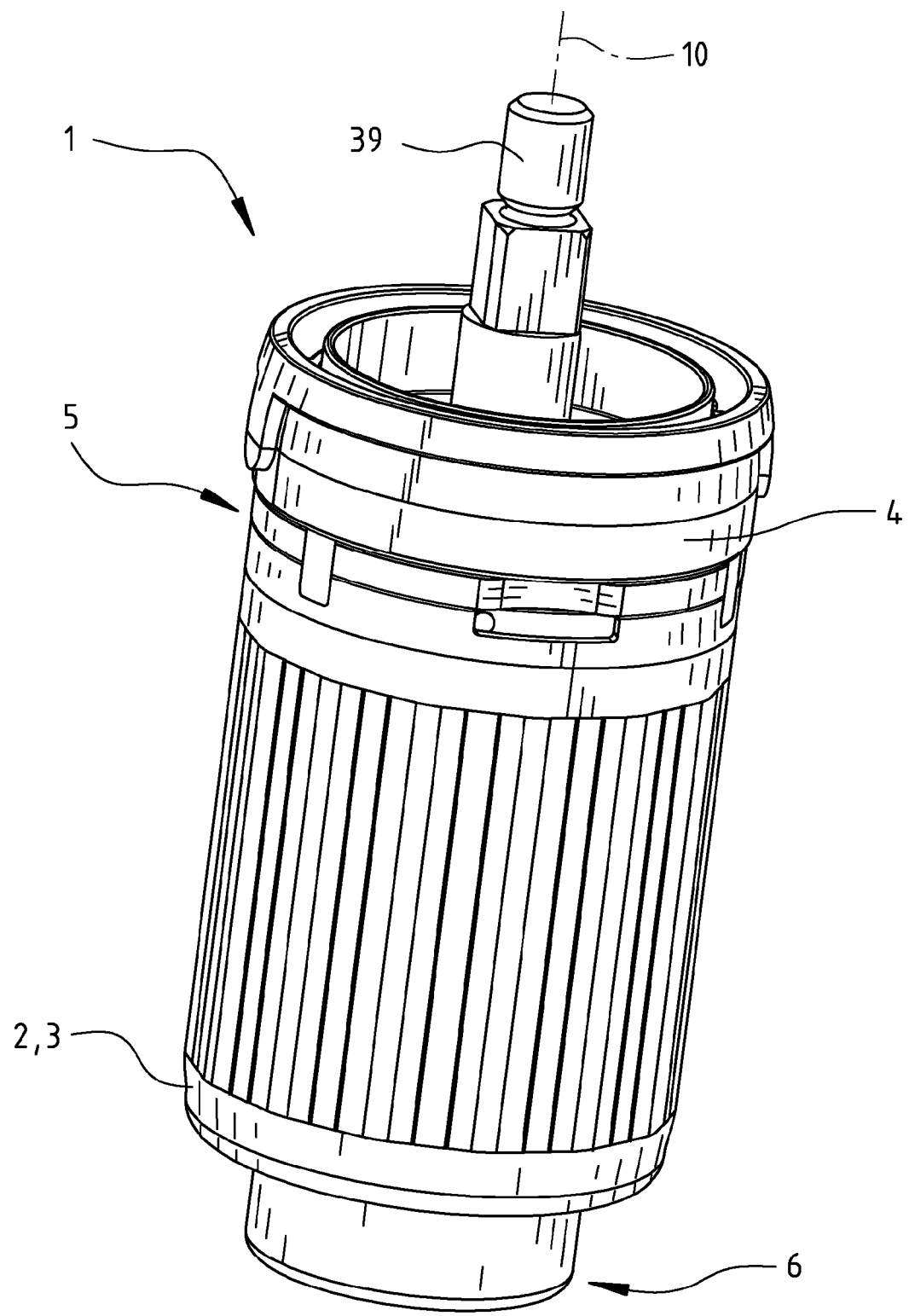
FIG. 1 is a perspective external view of an electric motor according to the present invention.

FIG. 1 is a perspective view of electric motor 1.

Figure 2:
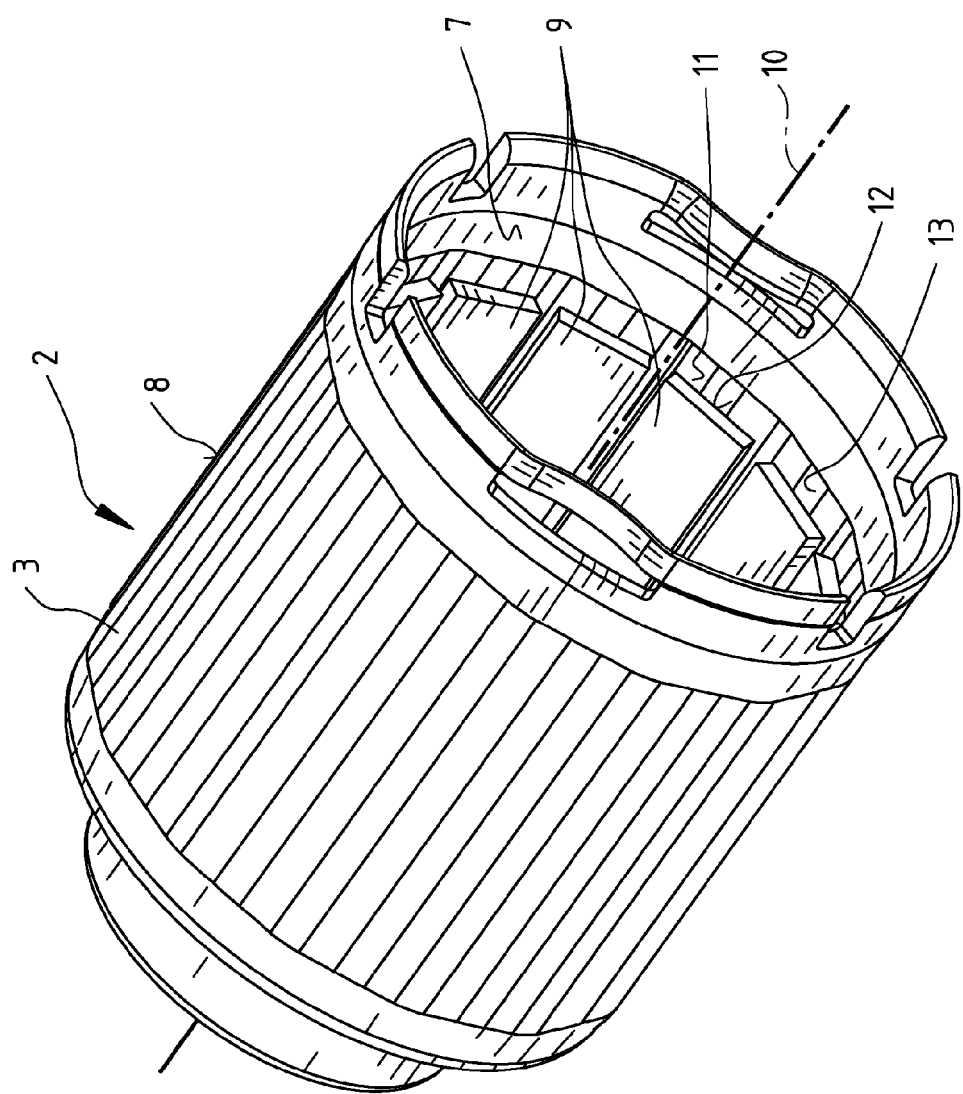
FIG. 2 is a perspective view of an external rotor of the electric motor.

FIG. 2 is a perspective view of external rotor 2 of electric motor 1. Rotor housing 3 is of hollow-cylindrical configuration and has an inner surface 7 as well as an outer surface 8. Inner surface 7 comprises a plurality of magnets 9 in the form of permanent magnets, which are of bar-shaped configuration. The plurality of magnets 9 are referred to hereinafter as "bar magnets." For simple and secured reception of bar magnets 9, receiving surfaces 11 are implemented on inner surface 7; a number of receiving surfaces 11 corresponds to the number of bar magnets 9.

Bar magnets 9 are preferably configured cuboidally and can thus be manufactured in simple fashion. On the surfaces that are lateral relative to receiving surface 11, and/or on the surface facing away from that surface, bar magnets 9 can alternatively have surfaces for which the angles are not right angles. For reception of a single bar magnet 9 on its designated receiving surface 11, receiving surface 11 is configured to be predominantly planar, i.e. flat, both in a circumferential direction of rotor housing 3 and in a longitudinal direction along rotation axis 10, so that bar magnet 9 is fastened in a flat manner with its fastening surface 12 facing toward inner surface 7.

Figure 3:
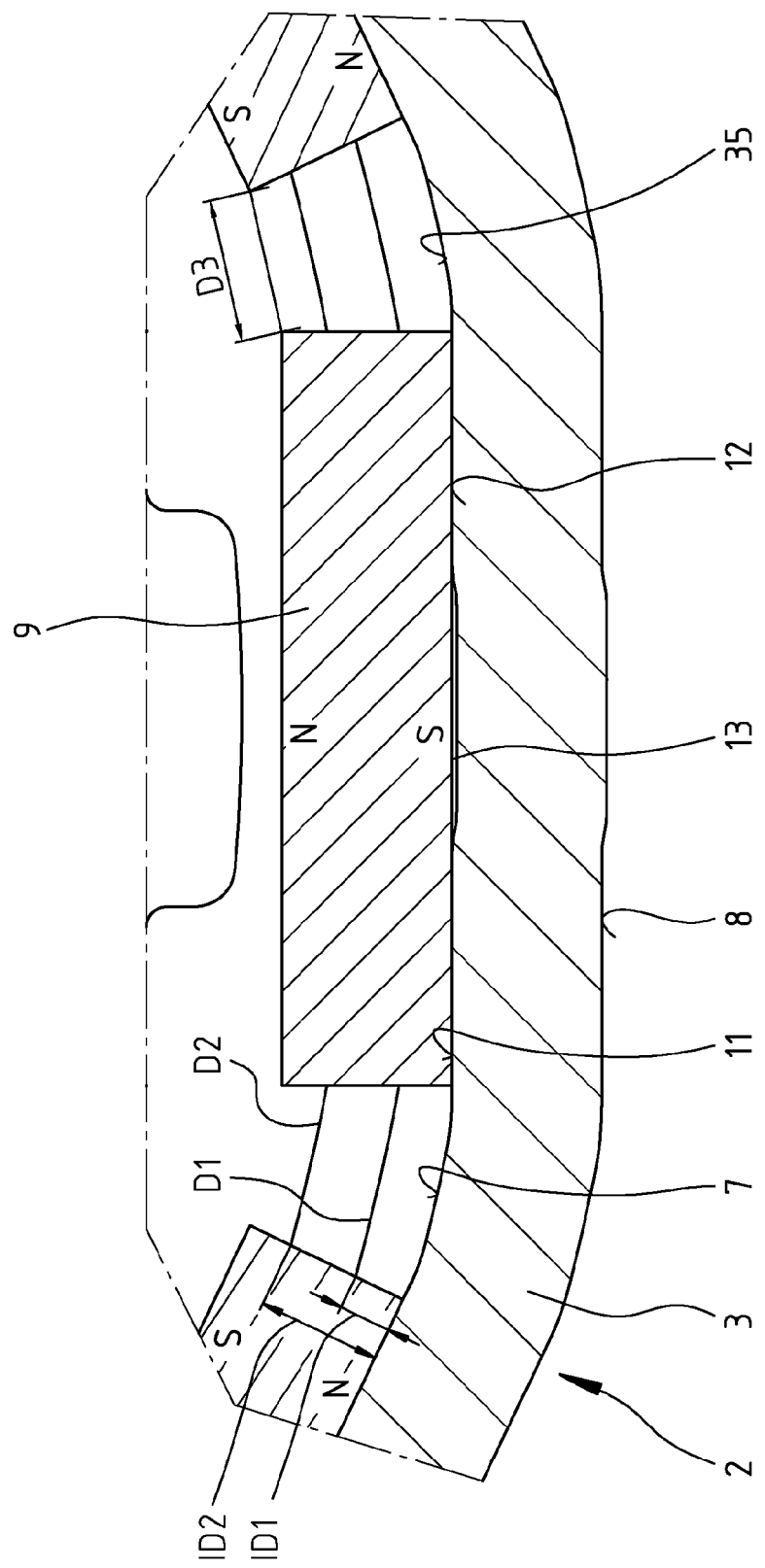
FIG. 3 is a cross section of the external rotor of the electric motor according to FIG. 1.

Receiving surfaces 11 each comprise a depression 13, this depression 13 being implemented in channel-like fashion as shown in FIG. 3. This depression 13 can be manufactured, for example, using a deep drawing process suitable for the production of rotor housing 3. Depressions 13 could likewise be introduced subsequently to the deep drawing process, for example by milling into rotor housing 3, although as a result a fiber direction of the material would be destroyed and this would result in less long-lasting durability for external rotor 2.

Figure 10:
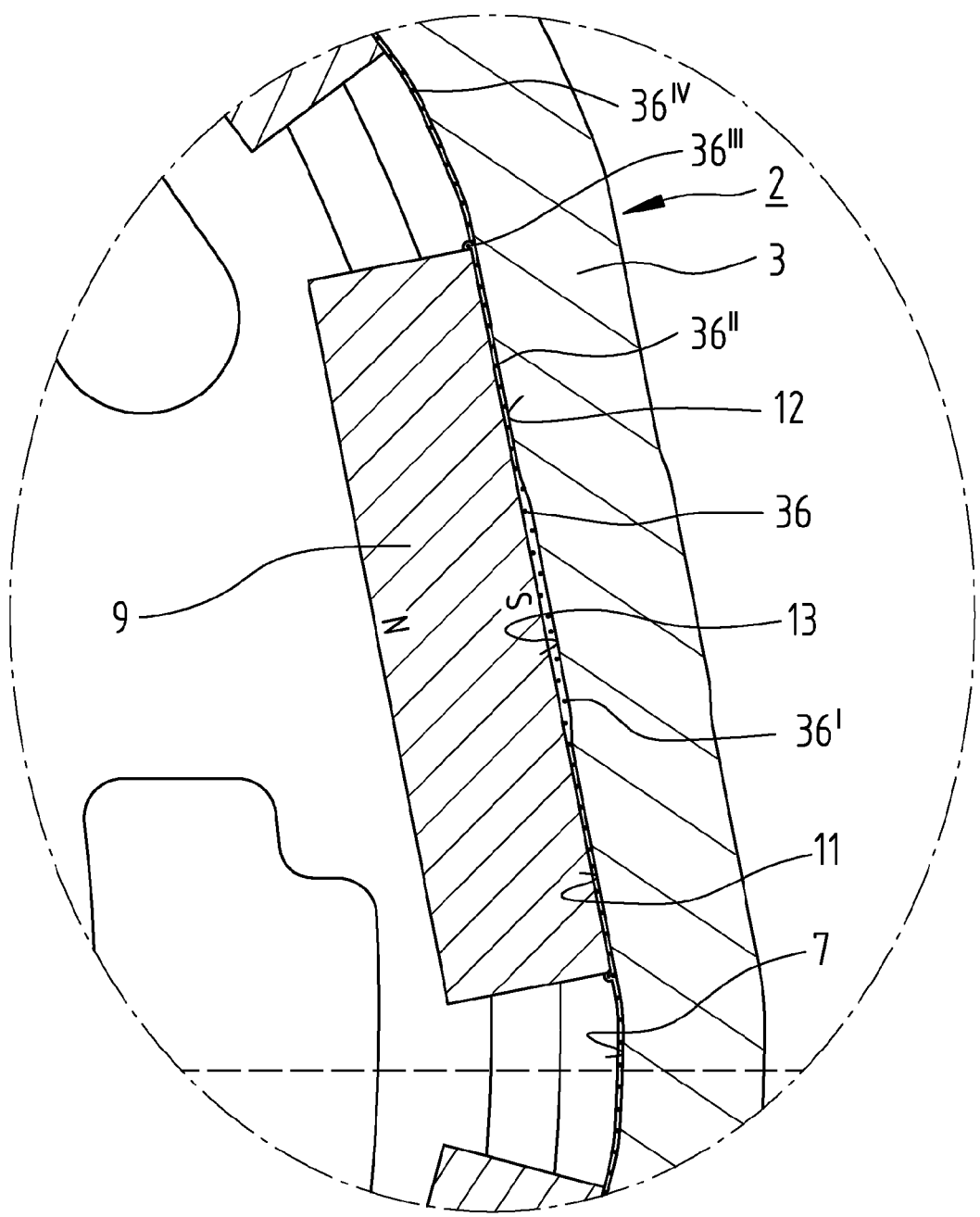
FIG. 10 is a cross section of the electric motor according to FIG. 1, schematically depicting a mounting agent.

Depressions 13 and receiving surfaces 11 are equipped with an adhesive mounting agent (fastening agent) 36 depicted in FIG. 10, for example an adhesive agent. A suitable mounting agent 36 is, for example, the DELO-ML DB180 adhesive of the DELO Industrie Klebstoffe company, Windach, Germany, whose chemical basis is modified urethane acrylate and which cures anaerobically and can be cured with UV light. Alternatively, the Loctite 3504 adhesive of the Henkel company can be used; the chemical basis of this is urethane methacrylate, and it cures with the aid of an activator. Mounting agent 36 is introduced onto receiving surfaces 11 and into the respective channel-like depression 13 prior to the fastening of bar magnets 9 on their receiving surfaces 11. This is done, for example, by applying the adhesive mounting agent 36 onto an inner location of the rotor housing and by subsequent rapid rotation of the rotor housing around its rotation axis 10. The adhesive mounting agent is thereby distributed or spin-coated over all the receiving surfaces 11 and depressions 13. Alternatively, an injection nozzle for the adhesive mounting agent 36 can be rotated and axially displaced with the rotor housing stationary, in order to spin-coat mounting agent 36 onto receiving surfaces 11.

In order to mount bar magnet 9 on its receiving surface 11, bar magnet 9 is guided, in an orientation parallel to rotation axis 10, in a radial direction onto receiving surface 11 until a contact exists between receiving surface 11 and fastening surface 12 with interposition of mounting agent 36. Bar magnet 9 is, so to speak, pressed from inside to outside against receiving surface 11. Partitions (called "shoulders") implemented on inner surface 7, against which bar magnets 9 could be pressed in an axial direction for retention, are preferably not present for reasons of simple manufacturability of rotor housing 3 using the deep drawing process, so that bar magnets 9 are thus positioned on an open plane, i.e. prior to fastening are, at least locally, shiftable in all directions parallel to receiving surface 11.

In an external-rotor motor, magnets 9 are preferably radially magnetized (see North poles labeled N, and South poles labeled S, in FIG. 3) since the effective magnetic flux is intended to flow between internal stator 21 and external rotor 2. Magnetization of magnets 9 is preferably accomplished after the fastening of magnets 9 in rotor housing 3, the magnetization apparatus being positioned for this into the vicinity of magnets 9 from the inner side of rotor housing 3.

In the embodiment of FIG. 3 the distance of two adjacent magnets 9 from one another is labeled D1, D2, and D3, the respective distance being indicated at different predefined inner-surface distances ID1, ID2 and at the maximum inner-surface distance from inner surface 7. It is evident that the distance D1, D2, D3 decreases at least locally as the inner-surface distance increases, this preferably being the case over the entire region. This makes it easier to hold magnets 9 and press them on in the context of installation. The minimum distance between two adjacent magnets 9 is at D3, and D3 is thus a predefined minimum distance between the magnets.

A transition 35 is implemented between each two receiving surfaces 11, in such a way that a distance that is sufficient both for achieving a corresponding magnetic field and for installation exists between bar magnets 9, inner surface 7 having a substantially 14-sided polygonal cross-sectional contour for receiving fourteen bar magnets 9.

This number of fourteen bar magnets 9 or fourteen rotor poles has proven to be good in the context of the present electric motor, since a high power density can be achieved. In other application instances, however, a different number of rotor poles or magnets 9 can also be used. The number of stator poles depends on the one hand on the number of rotor poles and on the other hand on the type of motor used, i.e., for example, single-phase or three-phase.

The cross-sectional contour of transition 35 is preferably concave in order to enable good distribution of the adhesive agent over the periphery of inner surface 7. The transition between depressions 13 and receiving surfaces 11 does not need to be concave, since depressions 13 in a predefined axial region are preferably completely filled with the adhesive agent.

Curing of mounting agent 36 for secured fastening of bar magnets 9 on receiving surface 11 is accomplished, for example, with the aid of UV light irradiation. Curing of the mounting agent is achieved thereby in the aerobic region as well. Curing by introduction of an activator is also possible.

FIG. 10 schematically shows the distribution of the adhesive mounting agent 36 after curing, in a context of an application of the adhesive mounting agent 36 over the entire inner periphery of inner surface 7 in a predefined axial region as generated, for example, by means of the above-described rotation of rotor housing 3. Mounting agent 36 is in the region of depression 13 (36'), between magnet 9 and receiving surface 11 (36''), and in the region between the adjacent magnets 9 ($36^{IV}$). In addition, small beads of the adhesive mounting agent (36''') form at the edge of magnet 9 due to the pressing of magnets 9 against receiving surface 11 and are cured, for example, by UV (ultraviolet) light.

Figure 4:
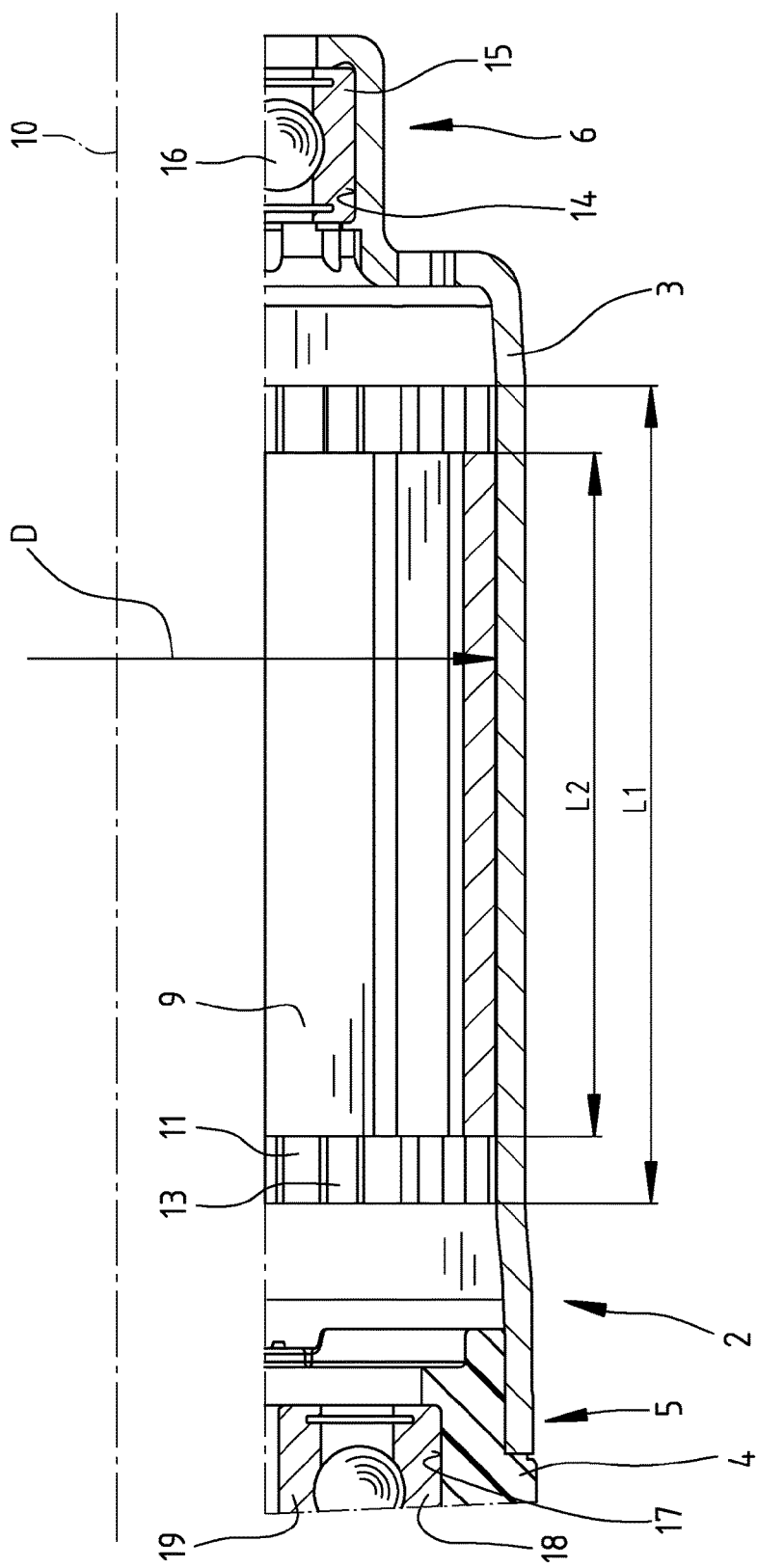
FIG. 4 is a longitudinal section of the rotor housing of the electric motor according to FIG. 1.

As may be seen in FIG. 4, depressions 13 have a first length L1 that is preferably greater than a second length L2 of an individual bar magnet 9. This has the advantage that excess mounting agent 36 can become distributed along depression 13 without influencing, in a radial or axial direction, a designated final position of bar magnet 9. The "final position" is to be understood as that position of bar magnet 9 which is provided for in the completed and operationally ready state of electric motor 1. The excess mounting agent 36 can collect in the longitudinal portions of depression 13 which are not covered by bar magnet 9, and is likewise cured upon curing.

Rotor housing 3, implemented in the manner of a hollow cylinder or at least locally annular in cross section, has an inside diameter D that, proceeding from first end 5 to second end 6 in the direction of rotation axis 10, is implemented to be constant or decreasing in sections, as is evident in FIG. 4. This is favorable for manufacturing rotor housing 3 using the deep drawing process, so that post-processing such as milling, the disadvantage of which has already been recited, can be completely dispensed with.

Rotor housing 3 of the exemplifying embodiment is manufactured with the aid of a twelve-stage deep drawing tool.

Rotor housing 3 preferably has a collar 304 (see FIG. 11) that can also be referred to as a "setback collar," which collar 304 is embodied in the form of a first bearing seat 14 and is designated for reception of a first bearing 16. First bearing 16 is preferably configured in the form of a ball bearing and comprises a first bearing cage or outer ring 15 that is preferably received nonrotatably in bearing seat 14. Rotor housing 3, manufactured preferably from steel, is particularly suitable for holding first bearing cage 15 with the aid of a so-called "upsetting" operation, in such a way that an intermaterial attachment, for example by adhesive bonding or an additional securing element, is not obligatorily necessary for nonrotatable and axial fastening of first bearing 16.

Figure 11:
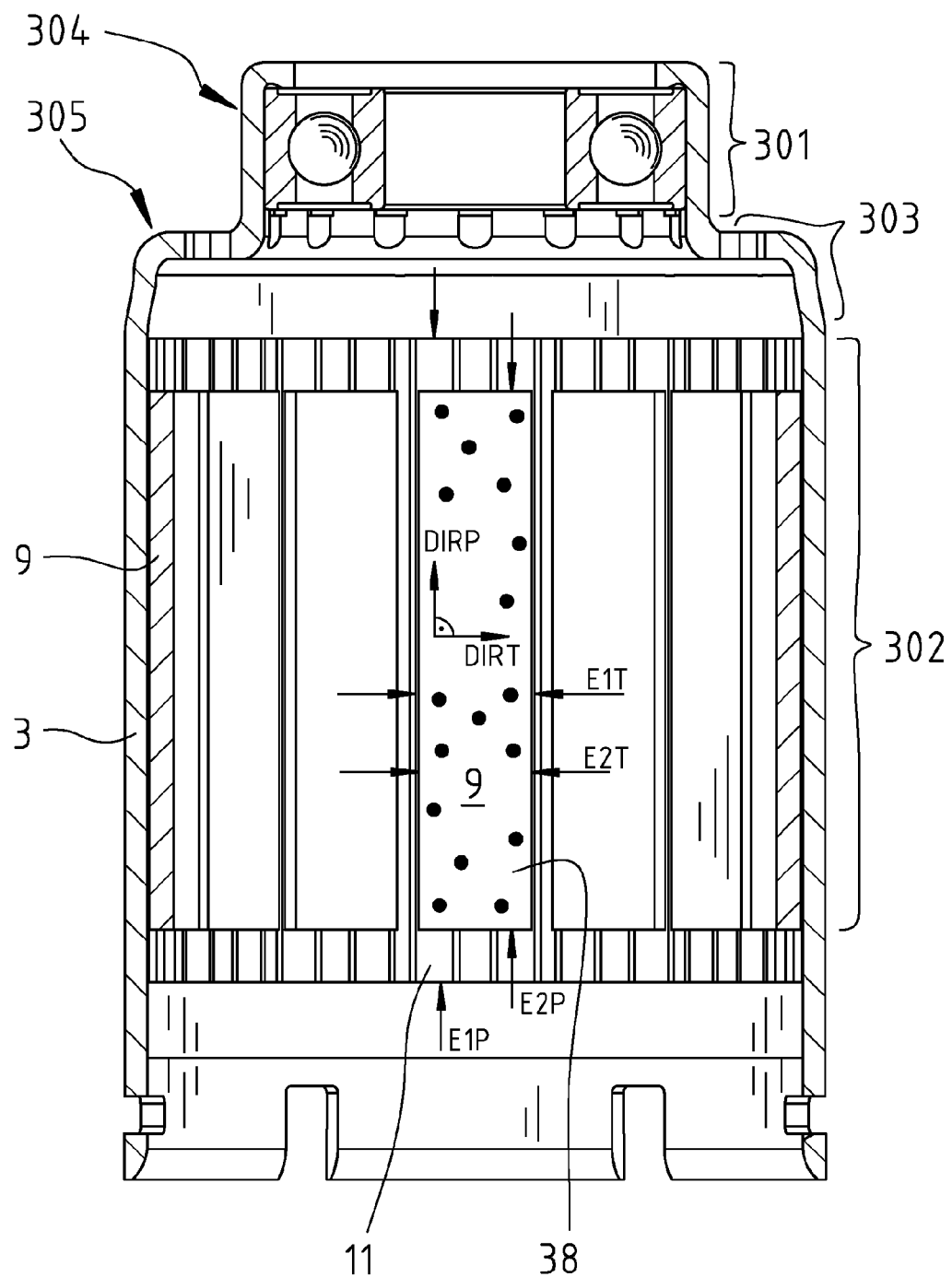
FIG. 11 is a plan view from inside of a magnet of the electric motor of FIG. 1.

As may be seen in FIG. 11, rotor housing 3 preferably has at second end 6 a first rotor housing portion 301 having an inside diameter D which is smaller than the inside diameter D of the rotor housing in a second rotor housing portion 302 in which the magnets are mounted. Bearing seat 14 can thereby be formed at second end 6.

Rotor housing 3 preferably has a taper in a third rotor housing portion 303 that is arranged between the first rotor housing portion and a second rotor housing portion 302; i.e. the outside diameter of the rotor housing becomes smaller toward first rotor housing portion 301. On the one hand this saves weight, and on the other hand according to this preferred configuration a bearing seat 14 having a smaller diameter can be constituted with no need to greatly increase the wall thickness of the rotor housing for that purpose.

Bearing seat 14 and rotor housing 3 preferably are implemented in one piece. This is advantageously possible, for example, in a deep drawing process.

At the other end of rotor housing 3, at its first end 5, roller flange 4 is implemented for fastening a drive roller 37 (shown in FIG. 7) at least partly surrounding rotor housing 3 and roller flange 4, and for receiving internal stator 21. Roller flange 4 comprises a second bearing seat 17 for receiving a second bearing cage or outer ring 18 of a second bearing 19, likewise in the form of a ball bearing or generally of a rolling bearing, or of a different bearing type.

Figure 5:
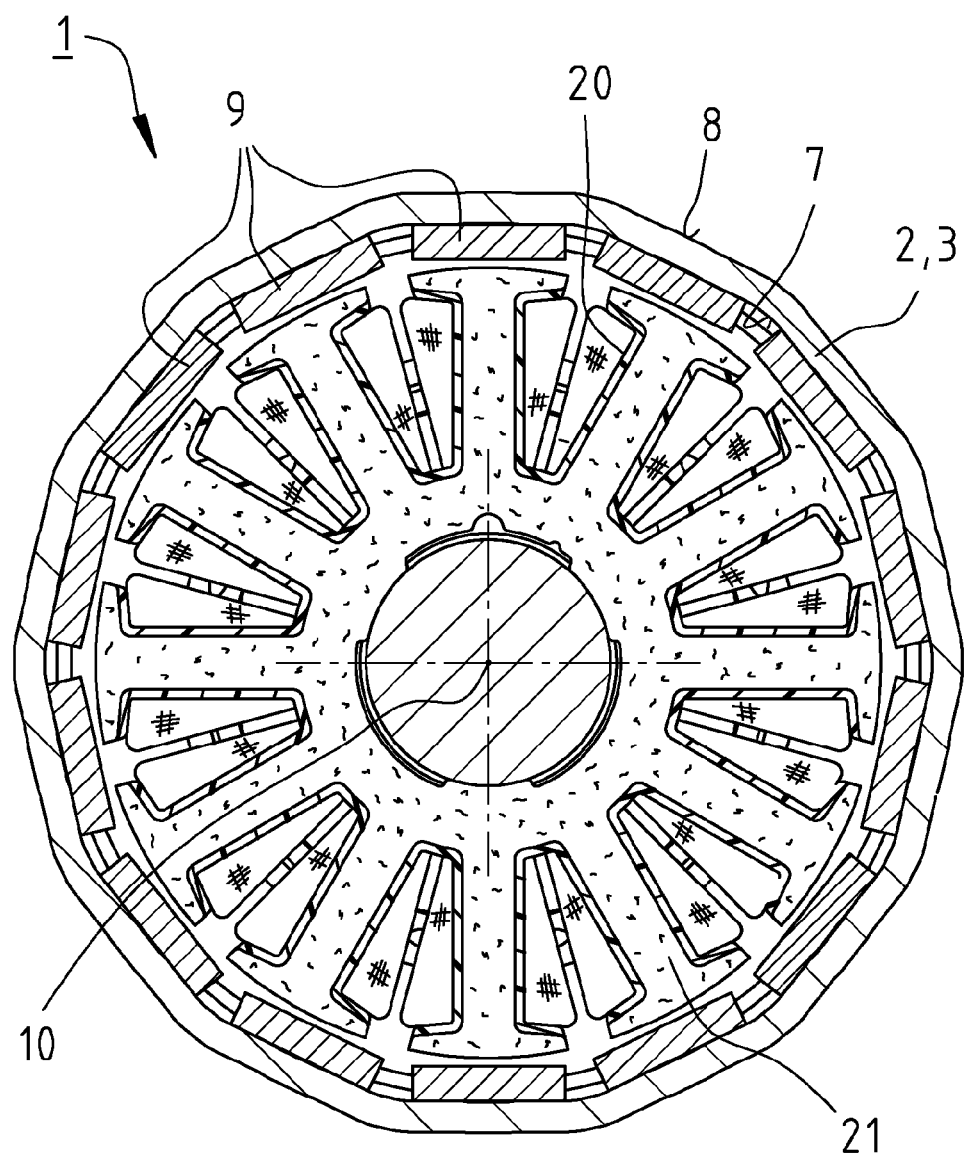
FIG. 5 is a cross section of the rotor housing and the stator of the electric motor according to FIG. 1.

In FIG. 5, rotor housing 3 of the electric motor is depicted in cross section. Winding slots or winding cavities 20 of internal stator 21 are provided opposite bar magnets 9. The present exemplifying embodiment comprises a total of twelve winding slots 20.

As depicted in FIG. 6 to FIG. 9, roller flange 4 is implemented, with the aid of several fastening elements, for transferring a torque of rotor housing 3 and for secure absorption of axial and radial forces resulting from the torque.

Figure 6:
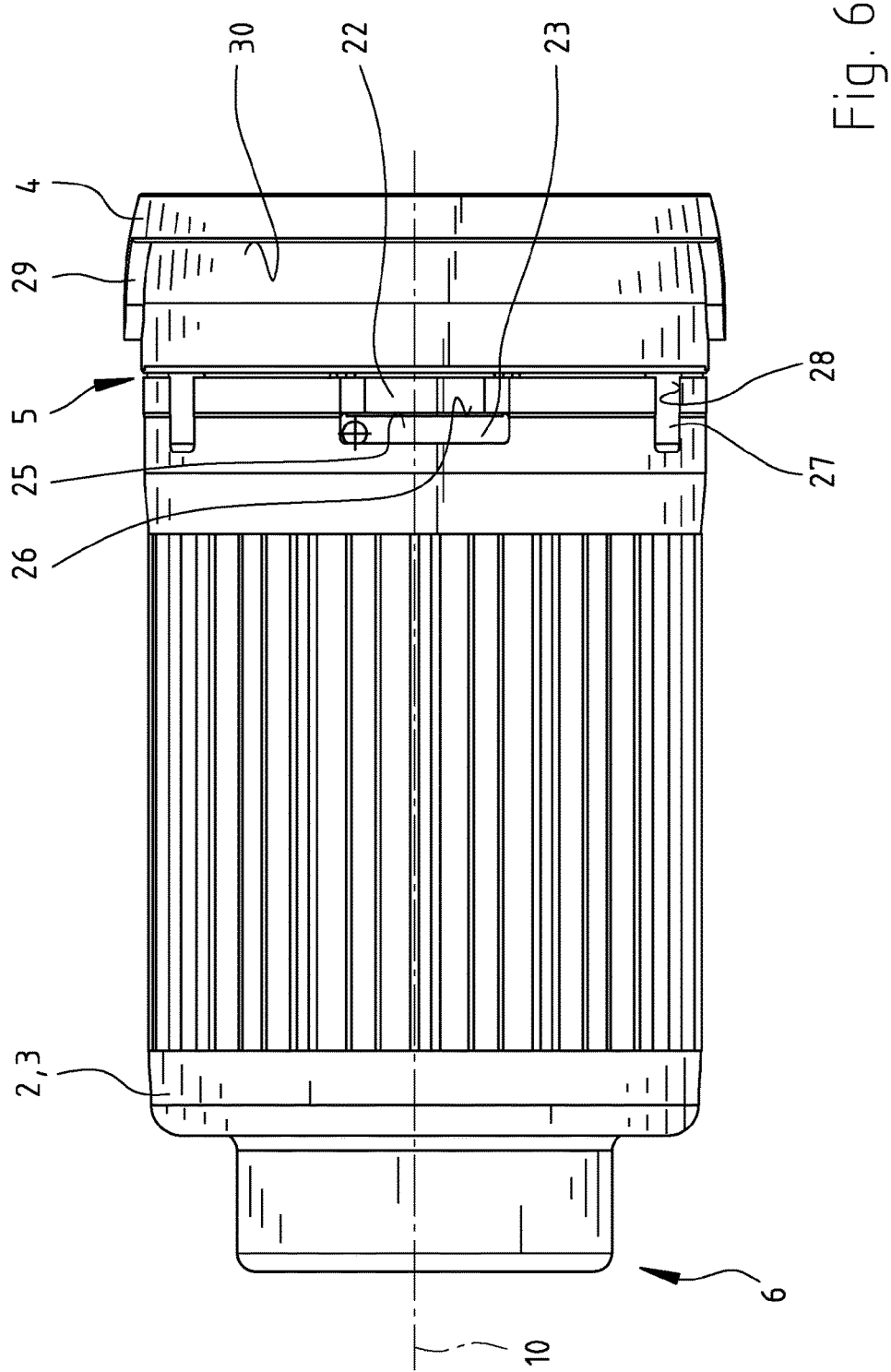
FIG. 6 is a first side view of the rotor housing and of a roller flange in a state with parts assembled.

Evident in particular in a first side view according to FIG. 6, which shows rotor housing 3 and roller flange 4 in a state with parts assembled, are a first fastening element 22 and a second fastening element 23, implemented complimentarily to first fastening element 22, for axial force absorption. First fastening element 22 is implemented in bridge fashion at first end 5 of rotor housing 3.

Second fastening element 23 is configured in a U-shape at third end 24 of roller flange 4 for radial reception of first fastening element 22; a bridge surface 25, positioned facing toward second fastening element 23, of first fastening element 22 braces against a contact surface 26, positioned facing toward bridge surface 25, of second fastening element 23 so that axial force absorption is implemented.

Figure 7:
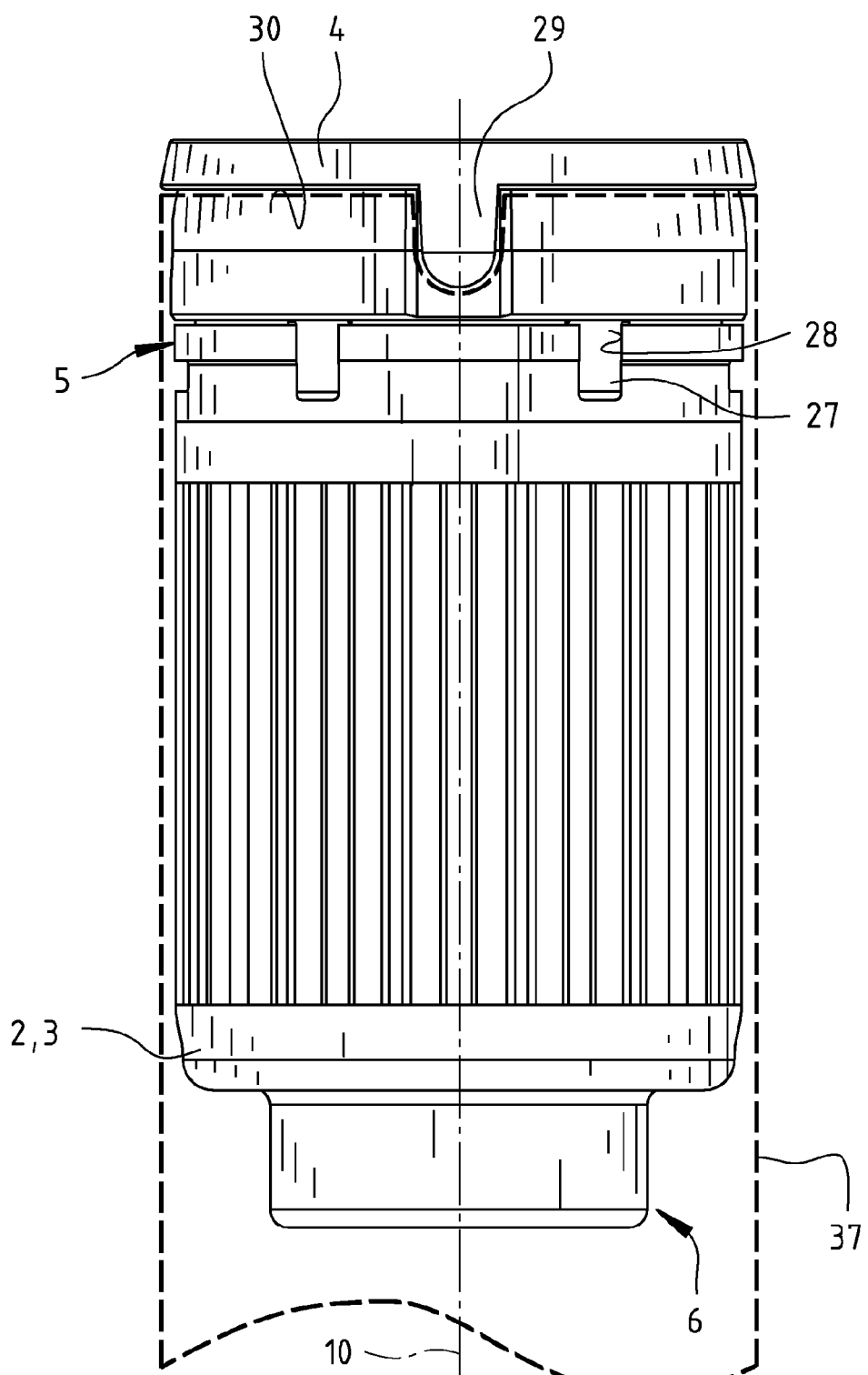
FIG. 7 is a second side view of the rotor housing and of the roller flange in a state with parts assembled.

Retention pegs 27, which are received in retention grooves 28 on rotor housing 3 that are complementary to retention pegs 27, are implemented on roller flange 4 in order to transfer a torque inducing the axial and radial forces. Fastening pegs 29, for positioning and fastening drive roller 37 depicted in FIG. 7, are also provided on roller flange 4. Drive roller 37 can be slid over rotor housing 3 and roller flange 4 in such a way that it at least partly surrounds rotor housing 3 and roller flange 4. It is slid, as far as an abutment shoulder 30 implemented on roller flange 4, into its final position, where it is fastened nonrotatably with the aid of fastening pegs 29. A positioning of two fastening pegs 29 located opposite one another, i.e. positioned with a mutual offset of 180° over a circumference of roller flange 4, has proven to be particularly suitable. In FIG. 7, a second side view of rotor housing 3 and roller flange 4 in a state with parts assembled, shows rotor housing 3 and roller flange 4 rotated 90° around rotation axis 10 with respect to the first side view; fastening peg 29 is depicted in plan view.

Figure 8:
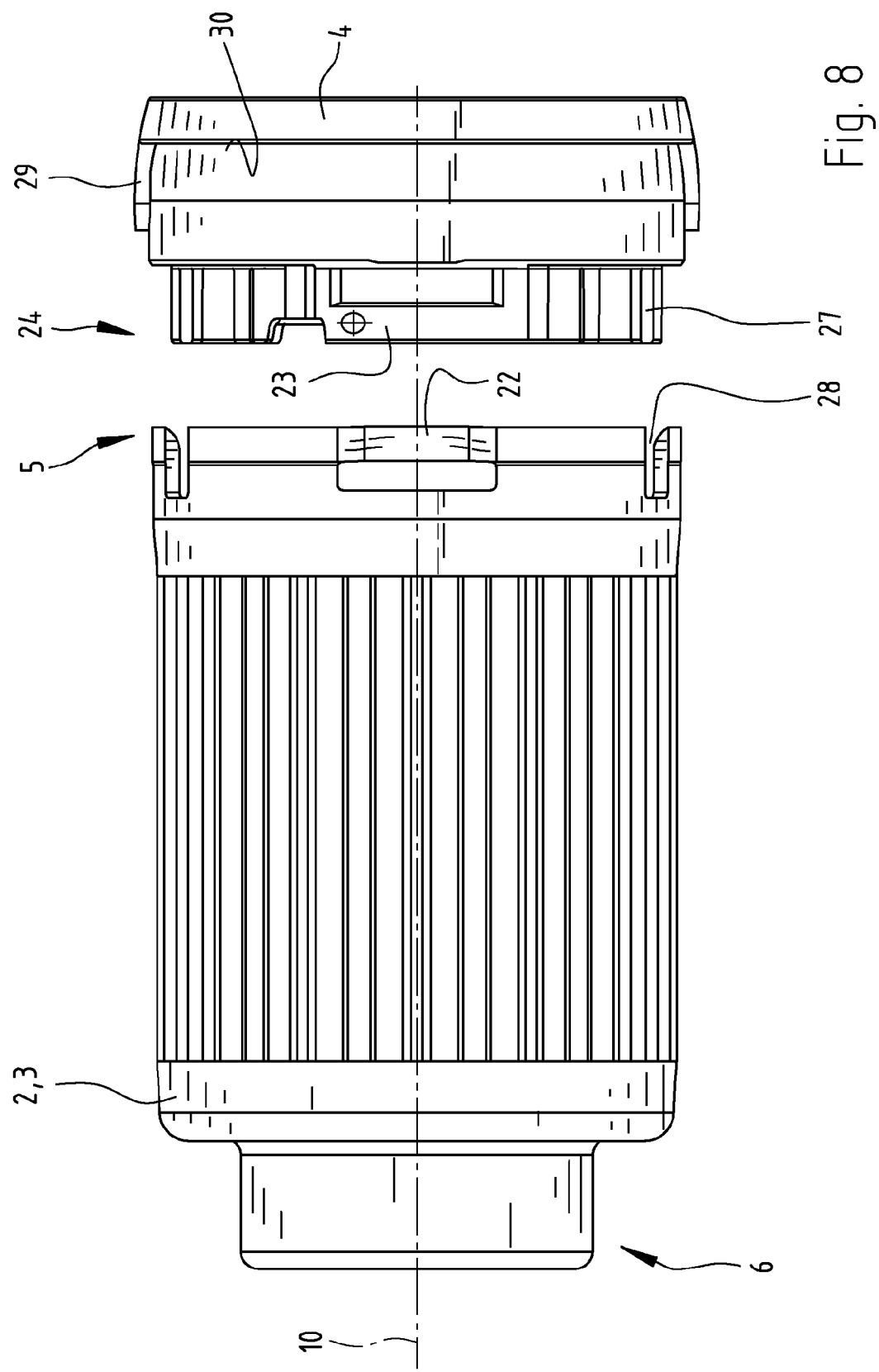
FIG. 8 is a first side view of the rotor housing and of the roller flange in a state with parts unassembled.
Figure 9:
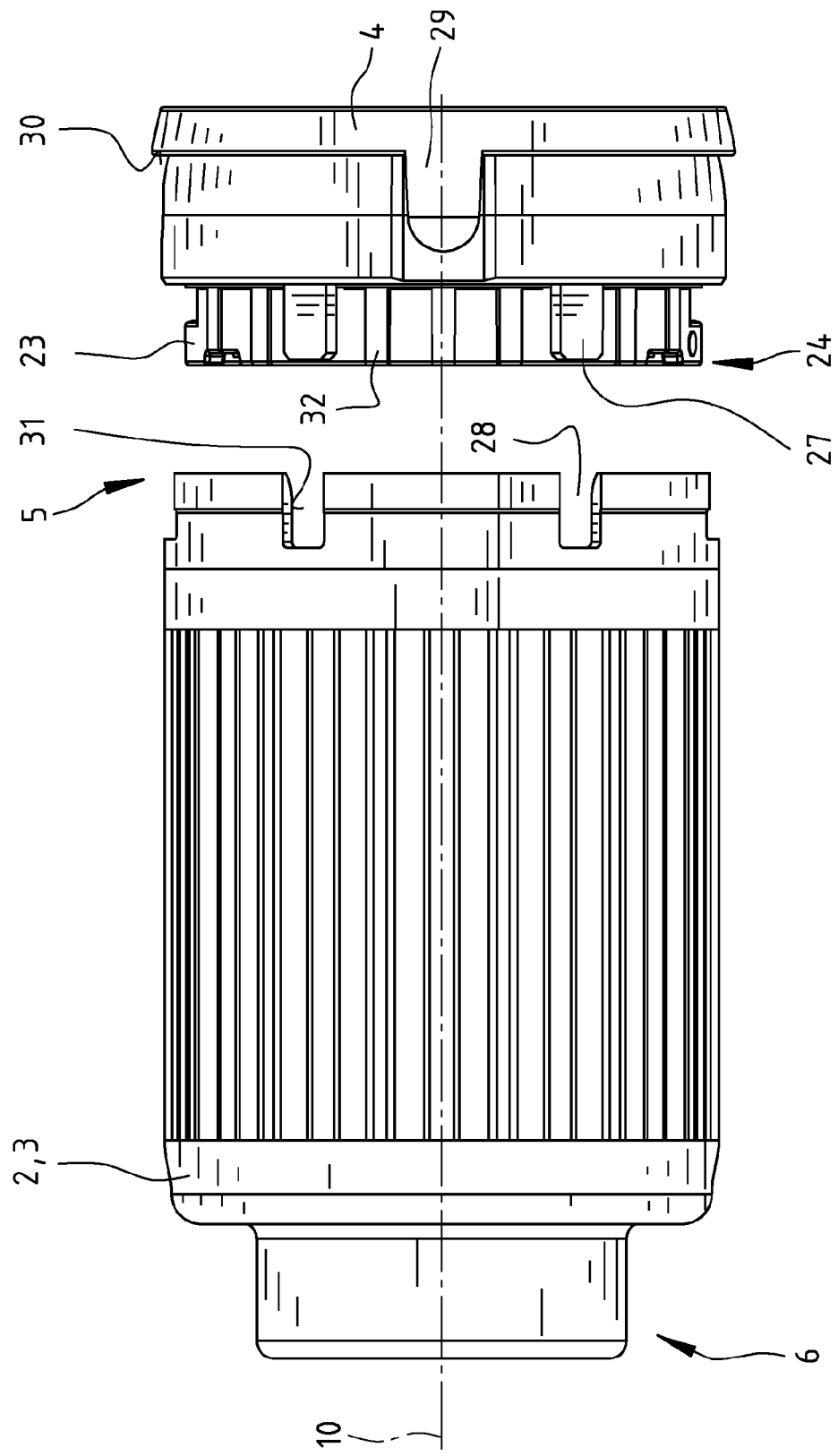
FIG. 9 is a second side view of the rotor housing and of the roller flange in a state with parts unassembled.

FIG. 8 and FIG. 9 show rotor housing 3 and roller flange 4 in a state with parts unassembled, respectively in the first side view and second side view; a third fastening element 31 and a fourth fastening element 32 are evident in particular in FIG. 9. Third fastening element 31 corresponds to inner surface 7 of rotor housing 3 at a first end portion 33, first end portion 33 being configured to be capable of receiving a second end portion 34 of roller flange 4 at third end 24. For the absorption of radial forces, fourth fastening element 32 is arranged at second end portion 34 over its circumference in the form of deformation ribs 32.

FIG. 11 is a view of a receiving surface 11 seen from rotation axis 10. A connecting region 38 is depicted with dots, and corresponds to the region in which magnet 9 and receiving surface 11 are arranged adjacently, i.e. are located next to one another. In the context of a cuboidal magnet 9 the connecting region corresponds, in the view from inside, to the radially inner surface of magnet 9. The adhesive mounting agent is preferably provided after installation at least in this connecting region 38. A first direction DIRP is shown parallel to rotation axis 10, and a second direction DIRT is drawn perpendicular to first direction DIRP and thus tangentially, these directions DIRT and DIRP being arranged in the receiving surface. The dimension of magnet 9 in the DIRT direction is labeled E2T, and in the DIRP direction is labeled E2P. The dimension of receiving surface 11 in the DIRT direction is labeled E1T, and in the DIRP direction is labeled E1P. Preferably E1P is greater than E2P, and E1T is greater than E2T. E1P and E2P and/or E1T and E2T can, however, be identical in size. Receiving surface 11 preferably extends outward beyond connecting region 38 on all sides thereof.

A drive roller 37 having a length of 600 mm and a diameter of 50 mm was driven with electric motor 1. Strong accelerations of, for example, 2 m/s² were tested, and magnets 9 did not detach in that context but instead were well fastened.

Numerous modifications are of course possible in the context of the present invention.

The two-part implementation with rotor housing 3 and roller flange 4 is advantageous, but this motor configuration is not obligatorily necessary for the magnet arrangement according to the present invention.

The rotor housing can also, for example, transition into a base in the manner of a rotor cup; and a shaft that is, for example, journaled in a bearing tube can be provided on the base.

It is also possible to configure the receiving surfaces without channel-like depressions; this has proven to be disadvantageous in terms of process engineering.

The invention claimed is:

1. An electric motor having an internal stator (21) and an external rotor (2), said external rotor (2) including a rotor housing (3) and a plurality of magnets (9) and being adapted to rotate, in operation, about a rotation axis (10) of said rotor, wherein said magnets (9) are formed as bar magnets, said rotor housing (3) has an inner surface (7), a first axial end (5), and a second axial end (6) located opposite the first end (5), said inner surface (7) being formed with respective receiving surfaces (11) adapted to receive said bar magnets (9);

said receiving surfaces (11) each define, with respect to a remainder of said inner surface (7), a channel depression (13), said receiving surfaces (11) have formed at least predominantly planar both in a direction parallel to the rotation axis (10) of the rotor housing (3) and in a circumferential direction along the inner surface (7), wherein said bar magnets (9) are respectively fastened onto one of the respective receiving surfaces (11) using an adhesive mounting agent (36), wherein a dimension (E1P), of the respective receiving surfaces (11) in a first direction (DIRP) that is parallel to the rotation axis (10), is larger than a dimension (E2P) of the associated magnets (9) in the first direction (DIRP), and in which a dimension (E1T), of the respective receiving surfaces (11) in a second direction (DIRT) that is perpendicular to the first direction (DIRP), is larger than a dimension (E2T) of the associated magnet (9) in the second direction (DIRT), and further comprising, at said second end (6) of the rotor housing (3), a first bearing seat (14) formed in said rotor housing and a first bearing cage (15) mounted in said first bearing seat (14).

2. The electric motor according to claim 1, wherein the respective receiving surfaces (11) and the associated magnets (9), at interfaces therebetween, define a series of respective connecting regions (38) in which said magnets (9) are arranged adjacently to one another, the receiving surfaces (11) each extending laterally beyond the respective connecting region (38) on all sides, thereby avoiding any need to provide a magnet abutment shoulder on the inner surface (7) of the rotor housing (3).

3. The electric motor according to claim 1, wherein a cross-sectional contour of a transition portion (35) of the inner surface (7), between two adjacent receiving surfaces (11), has a generally concave shape.

4. The electric motor according to claim 1, wherein the transition portion of the inner surface (7) has a polygonally shaped cross-sectional contour.

5. The electric motor according to claim 4, wherein the inner surface (7) has a 14-sided polygonal cross-sectional contour.

6. The electric motor according to claim 1, wherein the channel depressions (13) extend in a direction parallel to the rotation axis (10) of the rotor.

7. The electric motor according to claim 1, wherein the channel depressions (13) have, in a direction parallel to the rotation axis (10), a first length (L1) that is greater than a second length (L2) of the magnets (9), which second length (L2) extends in a direction parallel to the rotation axis (10).

8. The electric motor according to claim 1, wherein
the rotor housing (3) has an inside diameter (D) that is constant or decreasing, proceeding from the first end (5) of the rotor housing (3) to the second end (6) of the rotor housing (3).

9. The electric motor according to claim 1, wherein the rotor housing (3) has, at the second end (6), a first rotor housing portion (301) having an inside diameter, which inside diameter is smaller than an inside diameter (D) of the rotor housing (3) in a second rotor housing portion (302) in which the magnets (9) are mounted, thereby defining, at said second end (6), a bearing seat (14).

10. The electric motor according to claim 9, wherein the rotor housing (3) tapers in a third rotor housing portion (303), arranged between the first rotor housing portion (301) and the second rotor housing portion (302), said taper forming a shoulder (305).

11. The electric motor according to claim 9, wherein the bearing seat (14) and the rotor housing (3) are implemented as a single integral element.

12. The electric motor according to claim 1, wherein the magnets (9) are implemented as cuboidal bar magnets.

13. The electric motor according to claim 1, wherein a lateral distance between two adjacent magnets (9), within a predefined radial inner-surface distance range (ID) from the respectively associated inner surface (7) of the rotor housing (3), decreases, at least locally, as the inner-surface distance increases.

14. The electric motor according to claim 1, wherein a predefined minimum lateral distance (D3) is always provided between each two adjacent magnets (9).

15. The electric motor according to claim 1, wherein the plurality of magnets (9) are each formed predominantly of a magnetically anisotropic material.

16. The electric motor according to claim 1, wherein the plurality of magnets (9) are each formed of a permanently magnetic material.

17. The electric motor according to claim 1, wherein the magnets (9) each comprise sintered material.

18. The electric motor according to claim 1, wherein the rotor housing (3) is implemented as a deep drawn part by means of a deep-drawing process.

* * * * *